(12) United States Patent
Kanke (10) Patent No.: US 10,379,004 B2
(45) Date of Patent: Aug. 13, 2019

(54) VEHICLE TESTING DEVICE AND VEHICLE SPEED DEVIATION CALCULATION METHOD FOR VEHICLE TESTING DEVICE

(71) Applicant: MEIDENSHA CORPORATION, Tokyo (JP)

(72) Inventor: Masayasu Kanke, Kumagaya (JP)

(73) Assignee: MEIDENSHA CORPORATION, Tokyo (JP)

( * ) Notice: Subject to any disclaimer, the term of this patent is extended or adjusted under 35 U.S.C. 154(b) by 0 days.

(21) Appl. No.: 15/771,482

(22) PCT Filed: Aug. 10, 2016

(86) PCT No.: PCT/JP2016/073568
§ 371 (c)(1),
(2) Date: Apr. 27, 2018

(87) PCT Pub. No.: WO2017/073132
PCT Pub. Date: May 4, 2017

(65) Prior Publication Data
US 2018/0348088 A1 Dec. 6, 2018

(30) Foreign Application Priority Data
Oct. 30, 2015 (JP) .................. 2015-213568

(51) Int. Cl.
*G01M 17/007* (2006.01)
*G01L 5/28* (2006.01)

(52) U.S. Cl.
CPC ......... *G01M 17/0074* (2013.01); *G01L 5/282* (2013.01); *G01L 5/284* (2013.01); *G01M 17/007* (2013.01)

(58) Field of Classification Search
CPC . G01M 17/0074; G01M 17/007; G01L 5/282; G01L 5/284
See application file for complete search history.

(56) References Cited

U.S. PATENT DOCUMENTS 7,693,641 B2   4/2010   Maruki
9,008,935 B2   4/2015   Konishi
(Continued)

FOREIGN PATENT DOCUMENTS

JP   7-6875 B2   1/1995
JP   9-113418 A   5/1997
(Continued)

OTHER PUBLICATIONS

Japanese Decision of Patent and English translation, Application No. 2015-213568, Mar. 28, 2017, 5 pages.

*Primary Examiner* — Courtney D Heinle
(74) *Attorney, Agent, or Firm* — Foley & Lardner LLP (57) ABSTRACT

To obtain vehicle speed deviation data for changeover between accelerator and brake properly with inclination of a standard mode. In technique of calculating a changeover vehicle speed deviation from accelerator to brake in driving vehicle along standard mode (target vehicle speed) of vehicle drive pattern defined by time and vehicle speed within range of predetermined vehicle speed and time deviations from standard mode, an inclination AB of the standard mode is calculated by approximate differentiation of vehicle speed at a judgment standard point A of a current time instant on standard mode, first inclination AB is multiplied by an accelerator-to-brake changeover time deviation preset value $\Delta t_{-1}$, and the accelerator-to-brake changeover vehicle speed deviation from the judgment standard point A to a changeover judgment point E for changeover at the current time instant is calculated by addition of the product and an accelerator-to-brake changeover vehicle speed deviation preset value $\Delta V_{-1}$.

8 Claims, 7 Drawing Sheets

(56) References Cited

U.S. PATENT DOCUMENTS

2005/0234629 A1* 10/2005 Maruki ............ G01M 17/0072
                                                    701/93
2011/0015847 A1*  1/2011 Kanke .................. G01M 15/02
                                                    701/93
2013/0297169 A1* 11/2013 Konishi ............ B60W 50/0097
                                                    701/70

FOREIGN PATENT DOCUMENTS

| JP | 4349187 B2    | 10/2009 |
| JP | 5320827 B2    | 10/2013 |
| JP | 2013-231414 A | 11/2013 |

* cited by examiner

VEHICLE TESTING DEVICE AND VEHICLE SPEED DEVIATION CALCULATION METHOD FOR VEHICLE TESTING DEVICE

TECHNICAL FIELD

The present invention relates to a vehicle testing apparatus or device for testing a vehicle running on a chassis dynamometer, and more specifically to a technique of calculating a vehicle speed deviation for determining a changeover judgment point for changeover between an accelerator operation and a brake operation in a vehicle speed following control.

BACKGROUND ART

Figure 9:
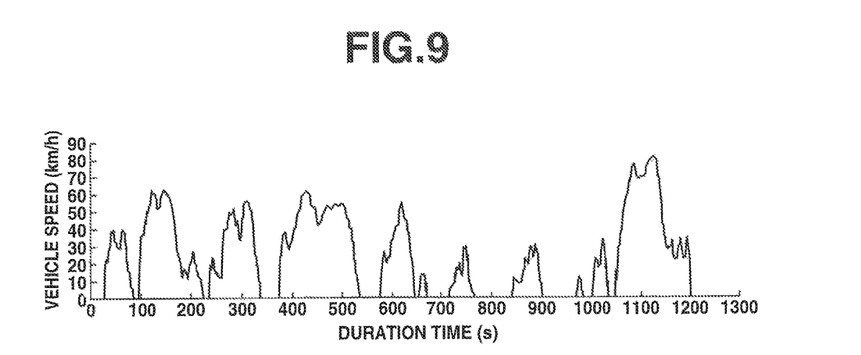
FIG. 9 is a characteristic view showing a test drive mode (JC08 mode).

Various performance tests such as tests for fuel economy and exhaust emission are conventionally performed by operating a test vehicle on a chassis dynamometer. In such a performance test, the vehicle is driven by performing the accelerator operation, brake operation and shift operation (and clutch operation in the case of a vehicle with a manual transmission) properly according to a drive pattern defined by time and vehicle speed like a fuel consumption test (JC08 mode) shown in FIG. 9, for example.

Figure 10:
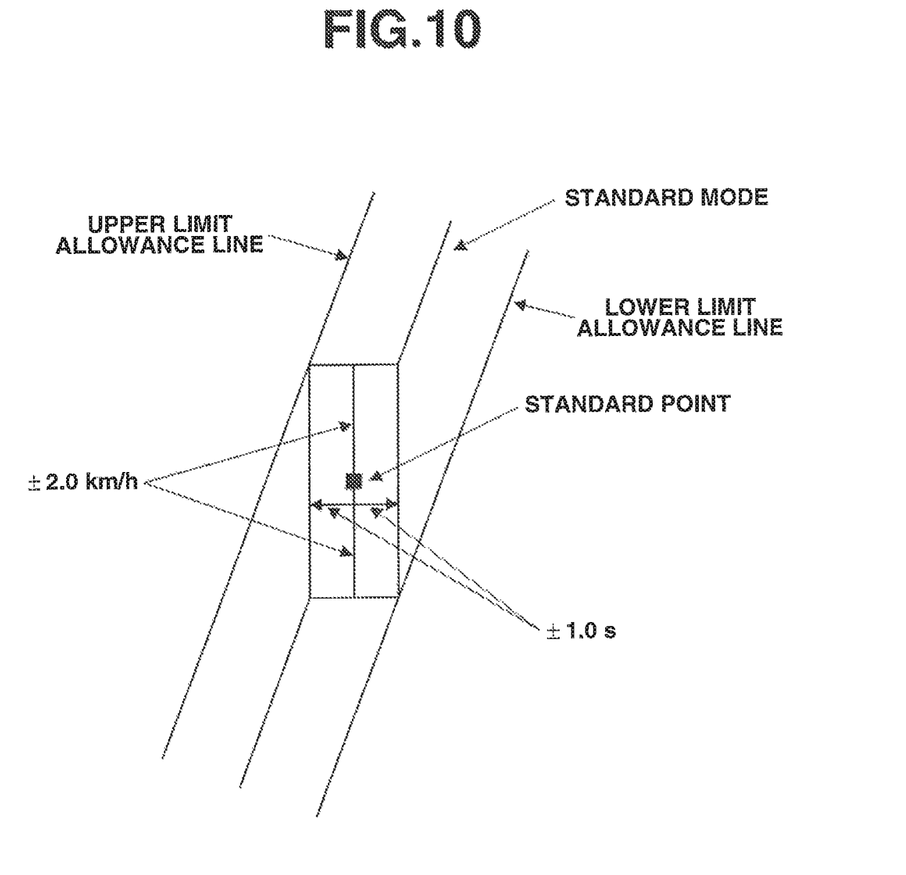
FIG. 10 is a view for illustrating a relationship among a standard mode, and upper and lower limit allowance lines in a conventional drive mode.

In a running operation, as shown in FIG. 10, as an example, the vehicle is required to run in an inside zone between an upper limit allowance line and a lower limit allowance line determined by a standard point of a standard mode (standard running mode) determined by time instant and vehicle speed and a rectangle determined by allowable values or allowable errors of ±2.0 km/h (±2.0 km/h in Japan and Europa, ±2.0 mile/h in U.S.A.) and ±1.0 sec.

In FIG. 10, the upper limit allowance line is a line obtained by connecting upper limit points of different time instants. Each of the upper limit points is a point spaced from the standard point of the standard mode at a given time instant, by +2.0 km/h and −1.0 sec. The lower limit allowance line is a line obtained by connecting lower limit points of different time instants. Each of the lower limit points is a point spaced from the standard point at a given time instant in the standard mode, by 2.0 km/h and +1.0 sec.

In this case, the vehicle speed of the test vehicle is controlled in a vehicle speed following control or follow-up control by the accelerator operation and the brake operation of the test vehicle, and the chassis dynamometer is controlled in a drive control according to a load drive pattern depending on the vehicle speed so as to produce an imaginary road surface resistance (load) with the roller(s) contacting with the tire(s) of the test vehicle.

The accelerator and brake operations may be performed by a human driver or may be performed by a drive operation robot.

For the above-mentioned control of the vehicle speed, for example, vehicle speed data is obtained by drive control along the standard mode according to a predetermined drive pattern, and the thus-obtained vehicle speed data is accumulated. At the time of testing, the thus-accumulated vehicle speed data is used as a vehicle speed command, and the vehicle speed following control is performed in accordance with a vehicle speed deviation between the vehicle speed command and a sensed actual vehicle speed.

Patent Document 1 discloses a brake operation timing automatic judging circuit for changeover between accelerator and brake in accordance with the above-mentioned vehicle speed deviation.

PRIOR ART DOCUMENT

Patent Document

Patent Document 1: JP4349187B2

SUMMARY OF THE INVENTION

The vehicle speed control of the earlier technology inclusive of Patent Document 1 is designed to improve the performance of following the standard vehicle speed mainly by paying attention to the vehicle speed deviation which is a difference between a standard command and a sensed vehicle speed.

However, as the inclination of the standard (running) mode increases, the vehicle speed deviation tends to become great because of the need for a follow-up performance at transition, and the system is apt to carry out the changeover between acceleration and braking. Thus, the earlier technology is insufficient to perform the vehicle speed control based on the vehicle speed deviation properly in accordance with the inclination of the standard mode.

The present invention has been devised to solve the above-mentioned problems. An object of the present invention is to provide vehicle testing apparatus and vehicle speed deviation calculating method for the vehicle tensing apparatus adequate for obtaining vehicle speed deviation data for changeover between accelerator and brake properly in accordance with the inclination of the standard mode.

To solve the above-mentioned problem(s), a vehicle testing apparatus, according to a first aspect of the present invention as defined in claim 1, for performing vehicle tests by operating a vehicle to run on a chassis dynamometer comprises a vehicle speed deviation calculating section to calculate at least one of a first changeover vehicle speed deviation for changeover from an accelerator or accelerator operation to a brake or brake operation and a second changeover vehicle speed deviation for changeover from the brake or brake operation to the accelerator or accelerator operation in a vehicle speed following control to drive the vehicle along a standard mode, as a target, of a vehicle drive pattern defined by time or time instant and a vehicle speed within a range or allowable range defined by a deviation of a predetermined vehicle speed and a deviation of a predetermined time from the standard mode.

The vehicle speed deviation calculating section is configured to perform at least one of first and second calculating processes.

The first calculating process is a calculating process of calculating a first inclination of the standard mode by approximate differentiation of the vehicle speed at a judgment standard point of a current time instant on the standard mode of the vehicle drive pattern, multiplying the first inclination of the standard mode by a first changeover time deviation preset value which is a preset value of a time deviation for changeover from the accelerator to the brake, and calculating the first changeover vehicle speed deviation from the judgment standard point to a changeover judgment point for changeover from the accelerator to the brake or accelerator-to-brake judgment point at the current time instant by addition of a product determined by multiplication of the first inclination and the first changeover time deviation preset value and a first changeover vehicle speed deviation preset value which is a preset value of the vehicle speed deviation for the changeover from the accelerator to the brake.

The second calculating process is a calculating process of calculating a second inclination of the standard mode by approximate differentiation of the vehicle speed at a judgment standard point of the current time instant on the standard mode of the vehicle drive pattern, multiplying the second inclination of the standard mode by a second changeover time deviation preset value which is a preset value of the time deviation for changeover from the brake to the accelerator, and calculating the second changeover vehicle speed deviation from the judgment standard point to a changeover judgment point for changeover from the brake to the accelerator or brake-to-accelerator judgment point at the current time instant by addition of a product determined by multiplication of the second inclination and the second changeover time deviation preset value and a second changeover vehicle speed deviation preset value which is a preset value of the vehicle speed deviation for the changeover from the brake to the accelerator.

A vehicle speed deviation calculating or calculation method, according to another aspect of the present invention as defined in claim 5, of calculating at least one of a first changeover vehicle speed deviation for changeover from an accelerator or accelerator operation to a brake or brake operation and a second changeover vehicle speed deviation for changeover from the brake or brake operation to the accelerator or accelerator operation in a vehicle speed following control to drive the vehicle along a standard mode of a vehicle drive pattern defined by time and a vehicle speed within a range or allowable range of a deviation of a predetermined speed and a deviation of a predetermined time from the standard mode, in a vehicle testing apparatus for performing vehicle tests by operating a vehicle on a chassis dynamometer.

The vehicle speed deviation calculating method performs at least one of first and second calculating processes.

The first calculating process is a calculating process of calculating a first inclination of the standard mode by approximate differentiation of the vehicle speed at a judgment standard point of a current time instant on the standard mode of the vehicle drive pattern, multiplying the first inclination of the standard mode by a first changeover time deviation preset value which is a preset value of a time deviation for changeover from the accelerator to the brake, and calculating the first changeover vehicle speed deviation from the judgment standard point to a changeover judgment point for changeover from the accelerator to the brake at the current time instant by addition of a product determined by multiplication of the first inclination and the first changeover time deviation preset value and a first changeover vehicle speed deviation preset value which is a preset value of the vehicle speed deviation for the changeover from the accelerator to the brake.

The second calculating process is a calculating process of calculating a second inclination of the standard mode by approximate differentiation of the vehicle speed at a judgment standard point of the current time instant on the standard mode of the vehicle drive pattern, multiplying the second inclination of the standard mode by a second changeover time deviation preset value which is a preset value of the time deviation for changeover from the brake to the accelerator, and calculating the second changeover vehicle speed deviation from the judgment standard point to a changeover judgment point for changeover from the brake to the accelerator at the current time instant by addition of a product determined by multiplication of the second inclination and the second changeover time deviation preset value and a second changeover vehicle speed deviation preset value which is a preset value of the vehicle speed deviation for the changeover from the brake to the accelerator.

According to the above-mentioned configuration, it is possible to obtain data of the vehicle speed deviation (the first changeover vehicle speed deviation for changeover from the accelerator to the brake and/or the second changeover vehicle speed deviation for changeover from the brake to the accelerator) to change over the operation between the accelerator and brake adequately in dependence on the inclination of the standard mode at the present or current time instant. Therefore, it is possible to improve the performance of following the target vehicle speed in the vehicle speed following or follow-up control by operating the accelerator and brake by the use of the thus-obtained vehicle speed deviation data.

In a vehicle testing apparatus according to a second aspect of the present invention as defined in claim 2, at least one of an accelerator to brake changeover line and a brake to accelerator changeover line is shifted toward the standard mode, by decreasing or setting at least one of the first or second changeover time deviation preset value and the first or second changeover vehicle speed deviation preset value in the first aspect, to a small value in the configuration of claim 1. The above-mentioned accelerator to brake changeover line is a line connecting the changeover judgment points for changeover from the accelerator to the brake at time instants in a standard mode running operation, and the brake to accelerator changeover line is a line connecting the changeover judgment points for changeover from the brake to the accelerator at time instants in the standard mode running operation.

According to the above-mentioned configuration, it is possible to set the accelerator to brake changeover line and/or the brake to accelerator changeover line closer to the standard mode. Therefore, it is possible to achieve a running operation closely along the standard mode.

In a vehicle testing apparatus according to a third aspect of the present invention as defined in claim 3, at least one of the or an the accelerator to brake changeover line and the or a brake to accelerator changeover line is shifted away from the standard mode within a range of an upper limit allowance line and a lower limit allowance line, by increasing at least one of the first or second changeover time deviation preset value and the first or second changeover vehicle speed deviation preset value in the first aspect to a great value, the accelerator to brake changeover line being a line connecting the changeover judgment points from the accelerator to the brake at time instants in a standard mode running operation, the brake to accelerator changeover line being a line connecting the changeover judgment points from the brake to the accelerator at time instants in the standard mode running operation.

According to the above-mentioned configuration, it is possible to set the accelerator to brake changeover line and/or the brake to accelerator changeover line remoter from the standard mode. Therefore, it is possible to decrease the frequency of the changeover between the acceleration and brake without passing across the upper limit and lower limit allowance lines. Consequently, it is possible to perform a driving operation advantageous for fuel consumption and emission gases within the allowable range of the vehicle speed.

In a vehicle testing apparatus according to a fourth aspect of the present invention as defined in claim 4, the vehicle testing apparatus according one of the first, second and third aspects further comprises a changeover control section configured to perform a changeover from the accelerator to the brake when an actual vehicle speed sensed at a time instant of each judgment standard point becomes higher than a first changeover line and to perform a changeover from the brake to the accelerator when the actual vehicle speed sensed at a time instant of each judgment standard point becomes lower than a second changeover line, the first changeover line being an accelerator to brake changeover line connecting a plurality of accelerator to brake changeover judgment points of a sequence of time instants in a running operation of the standard mode, and the second changeover line being defined as an brake to accelerator changeover line connecting a plurality of brake to accelerator changeover judgment points of a sequence of time instants in a running operation of the standard mode.

According to the above-mentioned configuration, it is possible to perform the drive control along the standard mode and without going beyond the upper limit and lower limit allowance lines.

(1) According to the aspects of claims 1~5, it is possible to obtain data of the vehicle speed deviation (the first changeover vehicle speed deviation for changeover from the accelerator to the brake and/or the second changeover vehicle speed deviation for changeover from the brake to the accelerator) to change over the operation between the accelerator and brake adequately in dependence on the inclination of the standard mode at the present or current time instant. Therefore, it is possible to improve the performance of following the target vehicle speed in the vehicle speed following or follow-up control by operating the accelerator and brake by the use of the thus-obtained vehicle speed deviation data.

(2) According to the aspect of claim 2, it is possible to set the accelerator to brake changeover line and/or the brake to accelerator changeover line closer to the standard mode. Therefore, it is possible to achieve a running operation closely along the standard mode.

(3) According to the aspect of claim 3, it is possible to set the accelerator to brake changeover line and/or the brake to accelerator changeover line remoter from the standard mode. Therefore, it is possible to decrease the frequency of the changeover between the acceleration and brake without passing across the upper limit and lower limit allowance lines. Consequently, it is possible to perform a driving operation advantageous for fuel consumption and emission gases within the allowable range of the vehicle speed.

(4) According to the aspect of claim 4, it is possible to achieve the drive control along the standard mode without passing across the upper and lower limit allowance lines.

MODE(S) FOR CARRYING OUT THE INVENTION

Figure 1:
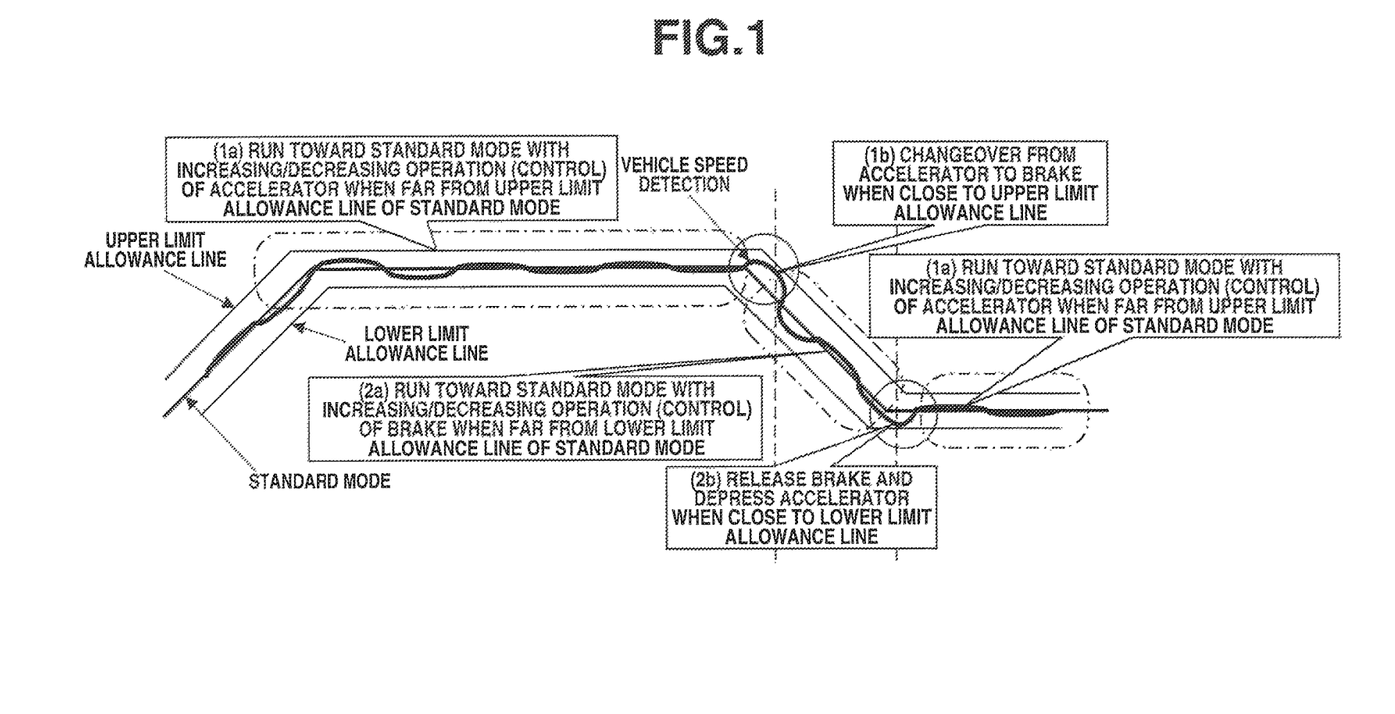
FIG. 1 is a schematic view of a drive pattern to which an embodiment of the present invention is applied.

Although the embodiment(s) of the present invention is explained hereinbelow with reference to the drawings, the present invention is not limited to the following embodiment(s). FIG. 1 shows one example of a drive pattern for driving a test vehicle with a changeover control between an accelerator and a brake of the test vehicle by using data on one or more changeover vehicle speed deviations obtained according to the present invention.

The upper and lower limit allowance or tolerance lines of FIG. 1 are determined by the standard point on the standard mode and the rectangle determined by allowable values or allowable errors of ±2.0 km/h and ±1.0 sec, as explained with reference to FIG. 10, and the Japanese standards stipulate that the test vehicle is operated to run in the inside region between the upper and lower limit allowance lines.

In this practical example of the embodiment, the vehicle is driven to run between the upper and lower limit allowance lines according to a following policy or plan.

(1) In the case of acceleration to follow the standard mode (1a) At a position far from the upper limit allowance line of the standard mode, the vehicle is operated to approach the standard mode by operating (controlling) the accelerator so as to increase or decrease the accelerator opening or accelerator depression.

(1b) At a position near the upper limit allowance line of the standard mode, the vehicle is operated by releasing the accelerator and depressing the brake or brake pedal.

(2) In the case of braking to follow the standard mode (2a) At a position far from the lower limit allowance line of the standard mode, the vehicle is operated to approach the standard mode by operating (controlling) the brake so as to increase or decrease the depression degree of the brake.

(2b) At a position near the lower limit allowance line of the standard mode, the vehicle is operated by releasing the brake and depressing the accelerator.

Figure 2:
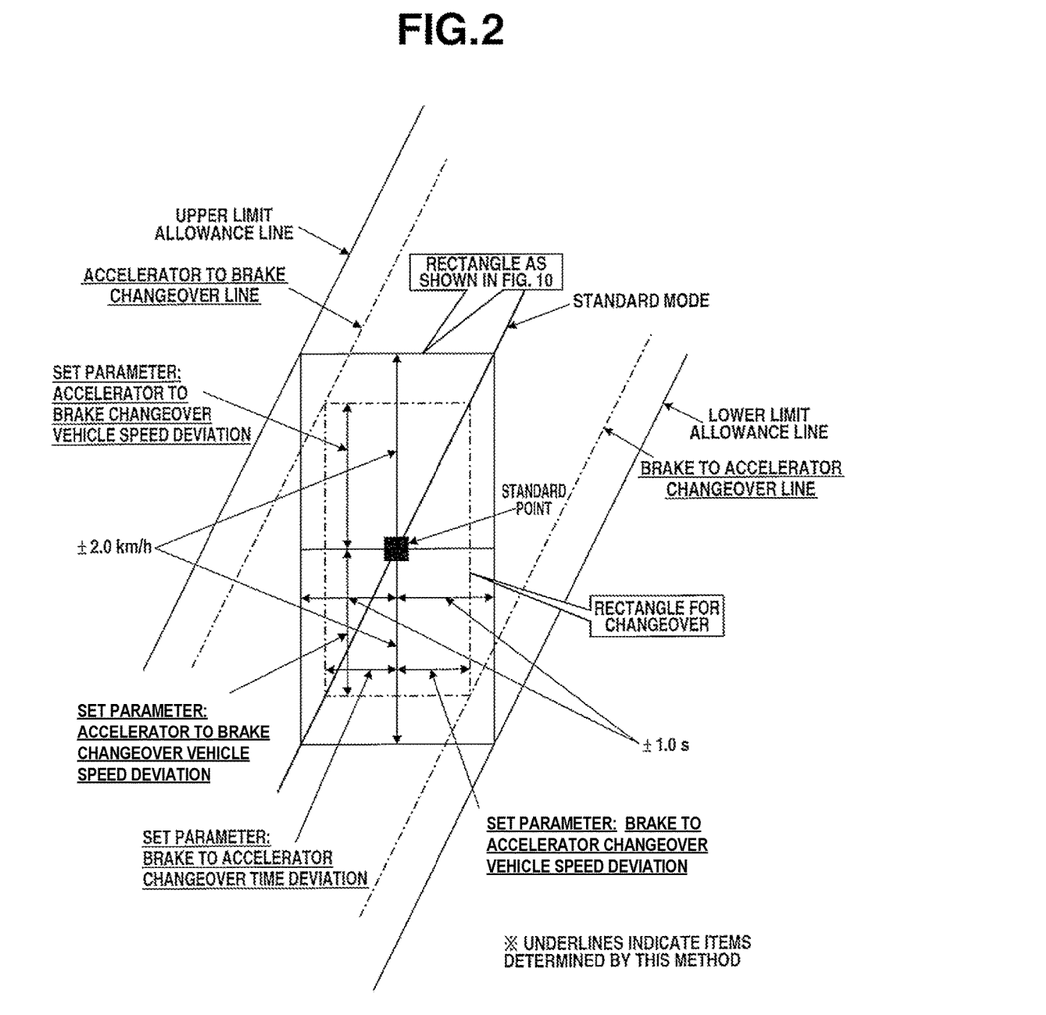
FIG. 2 is a view for illustrating a relationship among set parameters, standard mode and changeover lines between accelerator and brake, used in the calculation of the embodiment of the present invention.

In the case of the changeover operation between accelerator and brake in the above-mentioned phases (1b) and (2b), it is required to perform the changeover operation on the inner side of the upper limit allowance line or lower limit allowance line. Accordingly, as shown in FIG. 2, a rectangle of a one-dot chain line for the accelerator-brake changeover is set inside the rectangle of a solid line. In FIG. 2, the same signs and terms are used for the identical parts appearing in FIG. 10.

In FIG. 2, each of the long sides of the one-dot chain line rectangle for the changeover is made up of a preset or predetermined vehicle speed deviation for changeover from accelerator to brake (a first changeover vehicle speed deviation preset value which is a preset deviation of the vehicle speed at the time of changeover from accelerator to brake), and a preset or predetermined vehicle speed deviation for changeover from brake to accelerator (a second changeover vehicle speed deviation preset value which is a preset deviation of the vehicle speed at the time of changeover from brake to accelerator).

Each of the short sides of the one-dot chain rectangle for the changeover is made up of a preset or predetermined time deviation for changeover from accelerator to brake (a first changeover time deviation preset value which is a preset deviation of the time at the time of changeover from accelerator to brake), and a preset or predetermined time deviation for changeover from brake to accelerator (a second changeover time deviation preset value which is a preset deviation of the time at the time of changeover from brake to accelerator).

FIGS. 3~7 are views for illustrating a method of calculating the changeover vehicle speed deviation for changeover from accelerator to brake (the first changeover vehicle speed deviation) and determining a changeover line from accelerator to brake in accordance with the calculated changeover vehicle speed deviation, and a method of calculating the changeover vehicle speed deviation for changeover from brake to accelerator (the second changeover vehicle speed deviation) and determining a changeover line from brake to accelerator in accordance with the calculated changeover vehicle speed deviation for changeover from brake to accelerator. In FIGS. 3~6, "AC" stands for accelerator and "BR" for brake.

In this example of the embodiment, the time deviation or time deviations are taken into account in the calculation of the first changeover vehicle speed deviation and second changeover vehicle speed deviation to respond to the inclination or slope of the standard mode.

Figure 3:
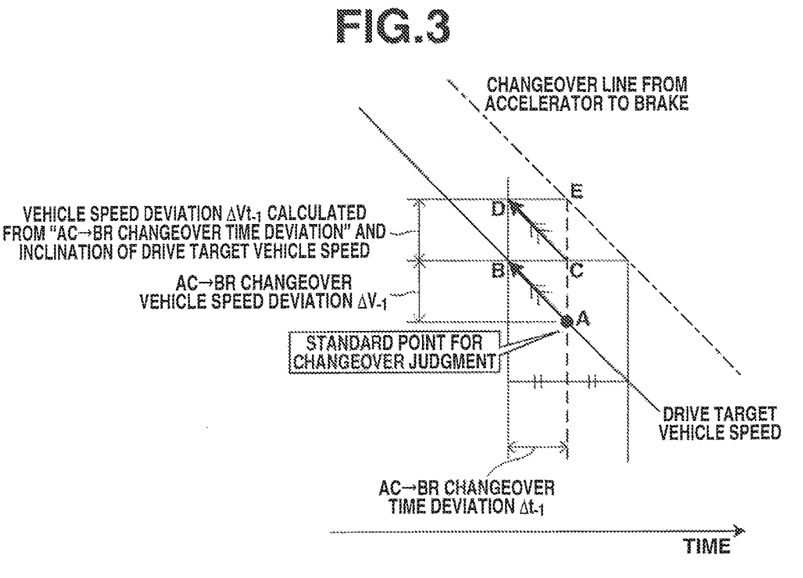
FIG. 3 is a view for showing a method of calculating a vehicle speed deviation for changeover from accelerator to brake in the embodiment of the present invention.

(1) Calculation Method of Accelerator to Brake Changeover Vehicle Speed Deviation and Changeover Operation A drive target vehicle speed shown by a solid line in FIG. 3 is a reference input to a vehicle speed control device (controller), obtained by processing or modifying the standard vehicle speed for operation such as an operation for smoothing a bent or angle of a line in FIG. 1, and/or an operation for an increase or raising of the drive pattern, like the standard mode of the drive pattern of FIG. 2. (In some cases, the standard vehicle speed itself is used without modification.)

A point A of the drive target vehicle speed is used as a standard point or reference point for judgment of changeover at a given time instant. From the judgement standard point A in the direction of the time axis, a time deviation at the changeover from accelerator to brake is set as an accelerator→brake changeover time deviation $\Delta t_{-1}$. From the judgement standard point A in the direction of the vehicle speed axis, a vehicle speed deviation at the changeover from accelerator to brake is set as an accelerator→brake changeover vehicle speed deviation $\Delta V_{-1}$. A point B is set as a point spaced from the point A by $\Delta t_{-1}$ and $\Delta V_{-1}$.

Then, an inclination AB (first inclination or slope: acceleration) is calculated by differentiating the drive target vehicle speed at the judgement standard point A by approximate differentiation such as difference method, and points C and D are determined by parallel translation or parallel displacement of the inclination AB in the speed increasing direction of the vehicle speed axis by equal lengths of $\Delta v_{-1}$.

Then, a vehicle speed deviation CE ($=\Delta Vt_{-1}$) is calculated by multiplying the inclination CD (having the same meaning as the first inclination AB) by the above-mentioned accelerator brake changeover time deviation ($\Delta t_{-1}$ (=CB).

Then, a vehicle speed deviation for changeover from accelerator to brake (the length of AE; first changeover vehicle speed deviation) is determined by addition of the accelerator→brake changeover vehicle speed deviation (set value) $\Delta V_{-1}$ (AC) and the above-mentioned vehicle speed deviation $\Delta Vt_{-1}$ (CE) obtained by the multiplication.

A point E is a changeover judgment point for the accelerator to brake changeover at a given time instant. Thus, a changeover line for the accelerator to brake changeover (one-dot chain line; one-dot chain line on the inner side of the upper limit allowance line of the solid line shown in FIG. 2) is determining by connecting (or tying) the changeover judgment points E each obtained at each time instant.

Figure 4:
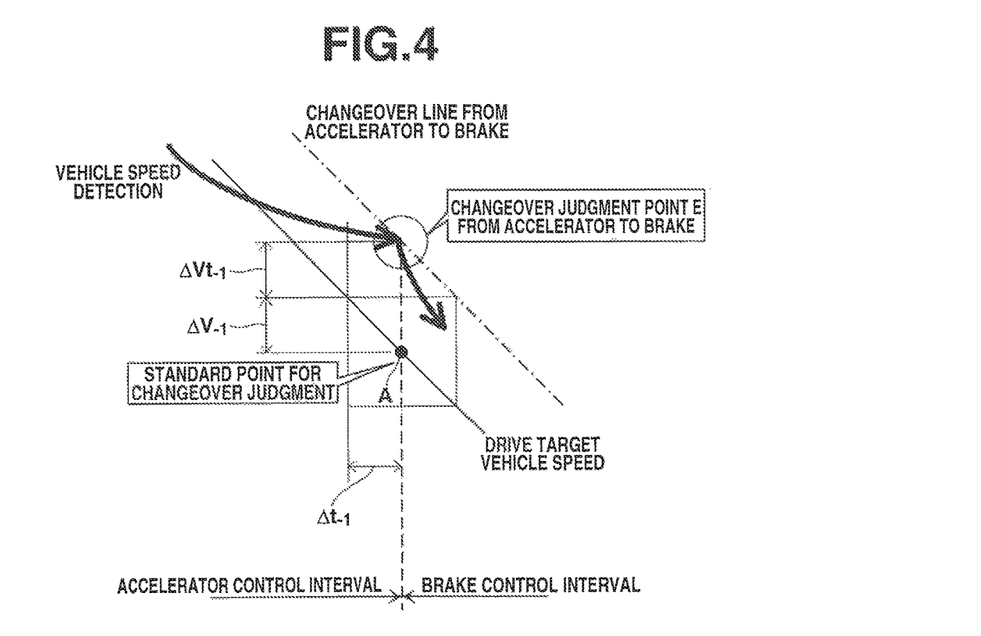
FIG. 4 is a view for illustrating action at the time of changeover from accelerator to brake according to the embodiment.

In the actual test drive, as shown in FIG. 4, the operation is changed over from accelerator to brake at the time instant of changeover judgment standard point A, when the sensed vehicle speed (value) shown by a bold solid line exceeds the accelerator to brake changeover line. In FIG. 4, the same signs are used for the same parts as in FIG. 3.

Figure 5:
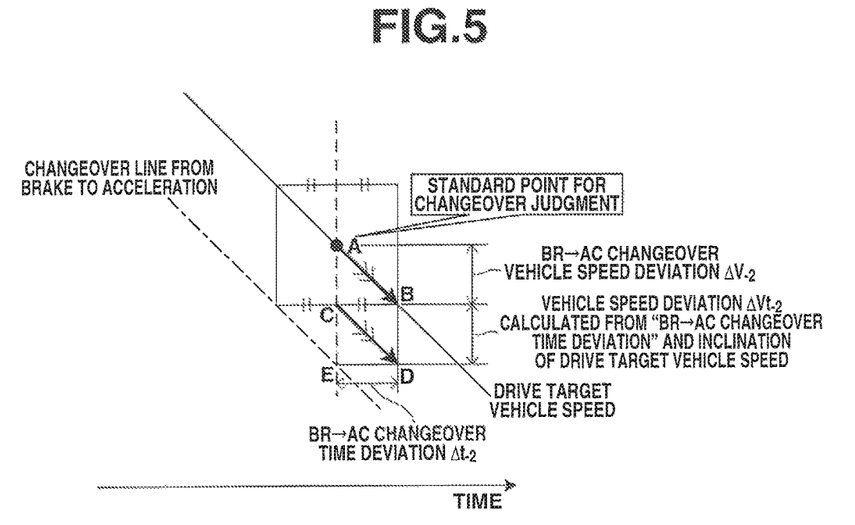
FIG. 5 is a view for showing a method of calculating a vehicle speed deviation for changeover from brake to accelerator in the embodiment.

(2) Calculation Method of Brake to Accelerator Changeover Vehicle Speed Deviation and Changeover Operation A drive target vehicle speed shown by a solid line in FIG. 5 is a reference input to the vehicle speed control device obtained by processing for operation such as an operation for smoothing a bent or angle of a line in FIG. 1, and/or an operation for an increase of the drive pattern like the standard mode of the drive pattern of FIG. 2. (In some cases, the standard vehicle speed itself is used instead.)

A point A of the drive target vehicle speed is set as a standard point or reference point of criterion for changeover judgment at a given time instant. A time deviation from the judgment standard point A in the direction of the time axis at the time of the changeover from brake to acceleration is set as a brake→accelerator changeover time deviation $\Delta t_{-2}$. A vehicle speed deviation from the judgment standard point A in the direction of the vehicle speed axis at the time of the changeover from brake to accelerator is set as a brake→accelerator changeover vehicle speed deviation $\Delta V_{-2}$. A point B is a point spaced from the point A by $\Delta t_{-2}$ and $\Delta V_{-2}$.

Then, an inclination AB (second inclination or slope: deceleration) is calculated by differentiating the drive target vehicle speed at the judgement standard point A by approximate differentiation such as difference method and points C and D are determined by parallel translation of the inclination AB in the speed decreasing direction of the vehicle speed axis by equal lengths $\Delta V_{-2}$.

Then, a vehicle speed deviation CE ($=\Delta Vt_{-2}$) is calculated by multiplying the inclination CD (having the same meaning as the second inclination AB) by the above-mentioned brake→accelerator changeover time deviation $\Delta t_{-2}$ (=CB).

Then, a vehicle speed deviation for changeover from brake to accelerator (the length of AE; second changeover vehicle speed deviation) is determined by addition of the brake→accelerator changeover vehicle speed deviation (set value) $\Delta V_{-2}$ (AC) and the above-mentioned vehicle speed deviation $\Delta Vt_{-2}$ (CE) obtained by the multiplication.

A point E is a changeover judgment point for the brake to accelerator changeover at a given time instant. Thus, a changeover line for the brake to accelerator changeover (one-dot chain line; one-dot chain line on the inner side of the lower limit allowance line of the solid line shown in FIG. 2) is determining by connecting (or tying) the changeover judgment points E each obtained at each time instant.

Figure 6:
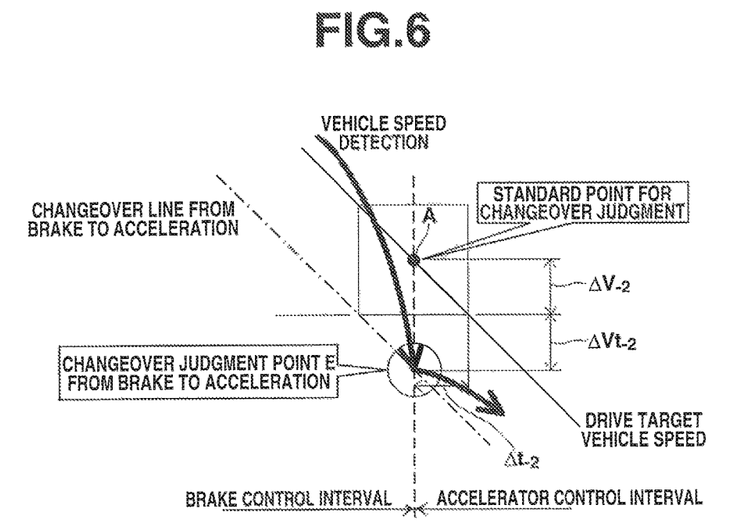
FIG. 6 is a view for illustrating action at the time of changeover from brake to accelerator according to the embodiment.

In the actual test drive, as shown in FIG. 6, the operation is changed over from brake to accelerator at the time instant of changeover judgment standard point A, when the sensed vehicle speed (value) shown by a bold solid line becomes lower than the brake to accelerator changeover line. In FIG. 6, the same signs are used for the same parts as in FIG. 5.

Figure 7:
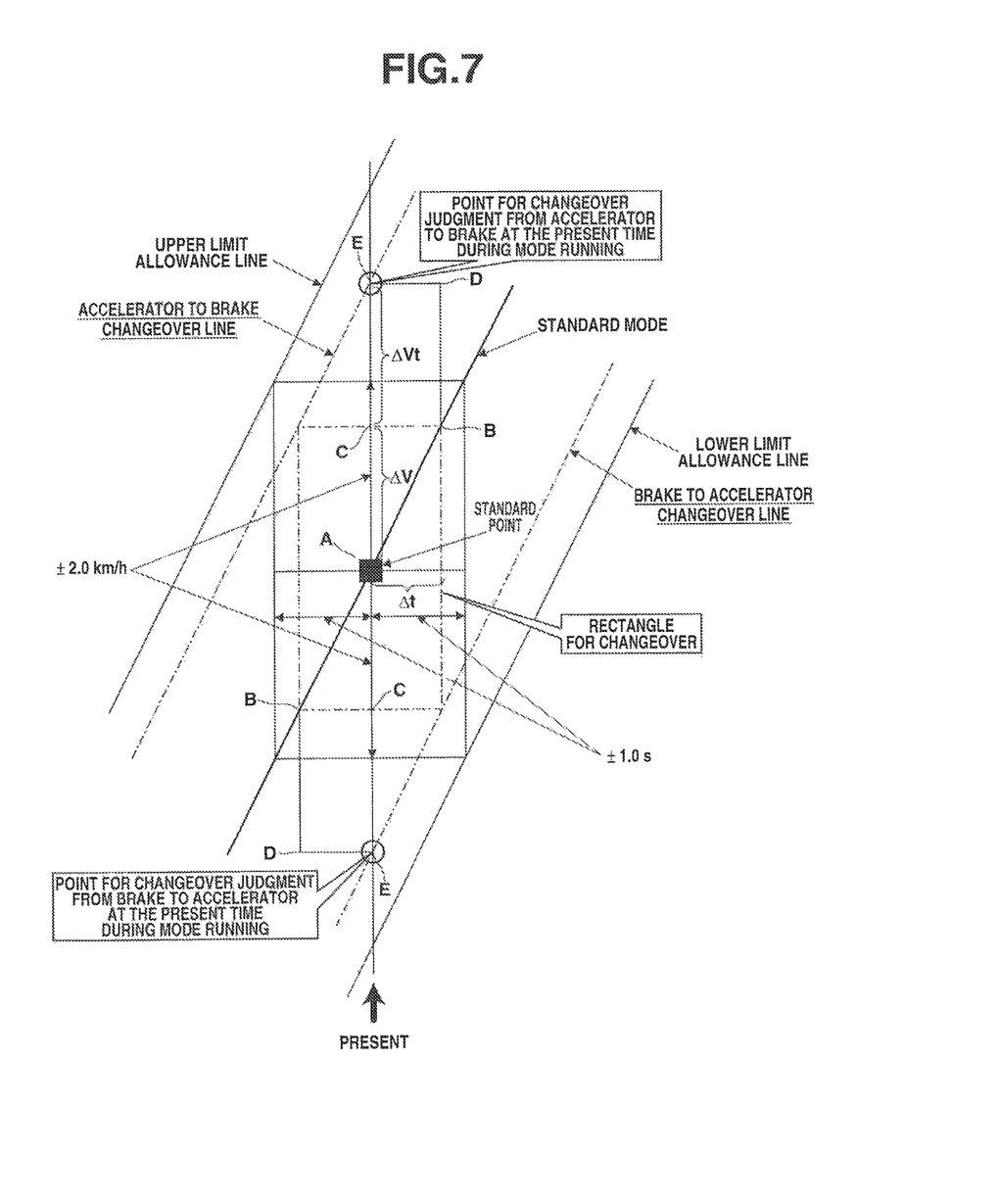
FIG. 7 is a view for illustrating a relationship among set parameters, standard mode, changeover lines between accelerator and brake, and changeover judgment points, used in the calculation of the embodiment of the present invention.

It is required to make a judgment as to the changeover from accelerator to brake or the changeover from brake to accelerator at the present time or current time instant during a running operation. FIG. 7 shows the point(s) to determine or judge the changeover (point E for changeover judgment).

In FIG. 7, the points A~E of FIG. 3 and FIG. 5 are superposed on the view of FIG. 2. The same signs and terms are used as in FIGS. 2, 3 and 5 for the identical parts. However, as to the vehicle speed deviations and time deviations, FIG. 7 shows the deviations $\Delta Vt$, $\Delta V$ and $\Delta t$ on the accelerator to brake changeover side only.

The set parameters or preset parameters are the accelerator to brake changeover vehicle speed deviation $\Delta V_{-1}$ (first changeover vehicle speed deviation preset value), the brake to accelerator changeover vehicle speed deviation $\Delta V_{-2}$ (second changeover vehicle speed deviation preset value), the accelerator to brake changeover time deviation $\Delta t_{-1}$ (first changeover time deviation preset value), and the brake to accelerator changeover time deviation $\Delta t_{-2}$ (second changeover time deviation preset value). If each of these set parameters $\Delta V_{-1}$, $\Delta V_{-2}$, $\Delta t_{-1}$ and $\Delta t_{-2}$ is set to a relatively small value, then the rectangle shown in FIGS. 2 and 7 by the one-dot chain line for the changeover becomes smaller, and the accelerator to brake changeover line and the brake to accelerator changeover line are set closer to the standard mode. Therefore, the vehicle is operated to run closely to the standard mode (along the standard mode) by performing the changeover control between accelerator and brake on the basis of the data calculated by using this setting.

Conversely, if each of these set parameters $\Delta V_{-1}$, $\Delta V_{-2}$, $\Delta t_{-1}$ and $\Delta t_{-2}$ is set to a relatively great value which is smaller than the limit of the range of ±2.0 km/h and ±1.0 sec determined by the standard, the one-dot chain line rectangle shown in FIGS. 2 and 7 for the changeover is made greater and the accelerator to brake changeover line and the brake to accelerator changeover line are set remoter from the standard mode. Therefore, by performing the changeover control between accelerator and brake on the basis of the data calculated by using this setting, it is possible to decrease the frequency of the changeover between acceleration and brake without passing over the upper and lower limit allowance lines of the standard mode. Accordingly, it is possible to drive the vehicle in a manner good for the fuel economy and emission within the allowable range of the vehicle speed.

Thus, the vehicle testing apparatus is arranged to calculate the vehicle speed deviation for changeover between accelerator and brake in accordance with the inclination or slope of the standard mode, and change over the operation of the test vehicle between the accelerator operation and the brake operation in accordance with the calculated vehicle speed deviation. For example, this vehicle testing apparatus is constructed as shown in FIG. 8.

Figure 8:
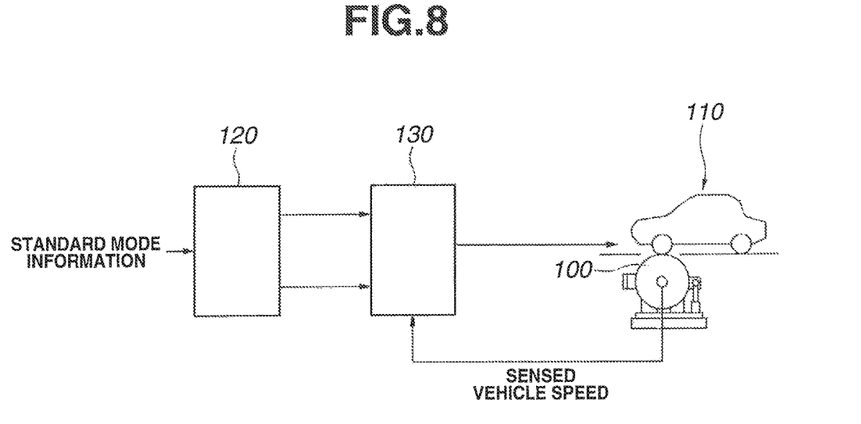
FIG. 8 is a view showing the construction of a vehicle testing apparatus according to the embodiment of the present invention.

In the system of FIG. 8, a test vehicle 110 is mounted on a chassis dynamometer 100, and the vehicle speed of test vehicle 110 is detected by a pulse sensor (not shown) provided in a roller of the chassis dynamometer 100. A vehicle speed deviation calculating section 120 is arranged to receive information on the drive target vehicle speed (standard mode) as shown in FIG. 3 and FIG. 5, for example, and to calculate the first changeover vehicle speed deviation (the length of AE in FIG. 3) for changeover from accelerator to brake and the second changeover vehicle speed deviation (the length of AE in FIG. 5) for changeover from brake to accelerator by performing the calculation ($\Delta Vt_{-1}+\Delta V_{-1}$, $\Delta Vt_{-2}+\Delta V_{-2}$) mentioned with reference to FIGS. 2~7.

A changeover control section 130 is arranged to define (form) the accelerator to brake changeover line, by the method mentioned in the explanation of FIG. 3, in accordance with the first changeover vehicle speed deviation determined by the vehicle speed deviation calculating section 120, to perform a changeover from accelerator to brake when the sensed vehicle speed of the test vehicle exceeds or becomes greater than the accelerator to brake changeover line as shown in FIG. 4, to define (form) the brake to accelerator changeover line, by the method mentioned in the explanation of FIG. 5, in accordance with the second changeover vehicle speed deviation, and to perform a changeover from brake to accelerator when the sensed vehicle speed of the test vehicle becomes lower than the brake to accelerator changeover line as shown in FIG. 6. In the example of FIG. 8, a controller for performing a vehicle test includes the vehicle speed deviation calculating section 120 and the changeover control section 130.

As mentioned above, the system according to this embodiment can obtain data of the vehicle speed deviation for changeover between accelerator and brake (the first changeover vehicle speed deviation for the changeover from accelerator to brake, the second changeover vehicle speed deviation for the changeover from brake to accelerator), adequately in accordance with the current inclination of the standard mode at the current time instant. Therefore, the system can improved the performance of following the vehicle speed in the vehicle speed following control, by operating the accelerator and brake in accordance with the thus-obtained changeover vehicle speed deviation data.

The invention claimed is:

1. A vehicle testing apparatus for performing vehicle tests by operating a vehicle on a chassis dynamometer, the vehicle testing apparatus comprising:
   the chassis dynamometer; and
   a controller configured to:
      control a speed of the vehicle on the chassis dynamometer by performing changeovers between an accelerator operation to accelerate the vehicle and a brake operation to decelerate the vehicle;
      calculate at least one of a first changeover vehicle speed deviation for changeover from the accelerator operation to the brake operation or a second changeover vehicle speed deviation for changeover from the brake operation to the accelerator operation in a vehicle speed following control to drive the vehicle along a standard mode of a vehicle drive pattern defined by time and a vehicle speed within a range of a deviation of a predetermined speed and a deviation of a predetermined time from the standard mode;
   wherein the controller is further configured to perform at least one of
      a first calculating process of calculating a first inclination of the standard mode by approximate differentiation of the vehicle speed at a judgment standard point of a current time instant on the standard mode of the vehicle drive pattern, multiplying the first inclination of the standard mode by a first changeover time deviation preset value which is a preset value of a time deviation for changeover from the accelerator operation to the brake operation, and calculating the first changeover vehicle speed deviation from the judgment standard point to an accelerator-to-brake changeover judgment point for changeover from the accelerator operation to the brake operation at the current time instant by addition of a product determined by multiplication of the first inclination and the first changeover time deviation preset value and a first changeover vehicle speed deviation preset value which is a preset value of the vehicle speed deviation for the changeover from the accelerator operation to the brake operation; or a second calculating process of calculating a second inclination of the standard mode by approximate differentiation of the vehicle speed at a judgment standard point of the current time instant on the standard mode of the vehicle drive pattern, multiplying the second inclination of the standard mode by a second changeover time deviation preset value which is a preset value of the time deviation for changeover from the brake operation to the accelerator operation, and calculating the second changeover vehicle speed deviation from the judgment standard point to a brake-to-accelerator changeover judgment point for changeover from the brake operation to the accelerator operation at the current time instant by addition of a product determined by multiplication of the second inclination and the second changeover time deviation preset value and a second changeover vehicle speed deviation preset value which is a preset value of the vehicle speed deviation for the changeover from the brake operation to the accelerator operation.

2. The vehicle testing apparatus as claimed in claim 1, wherein an upper limit allowance line is defined as a line connecting upper limit points each of which is an upper limit point at a given time instant deviated from the standard point of the standard mode at the given time instant by the predetermined speed and the predetermined time, a lower limit allowance line is defined as a line connecting lower limit points each of which is a lower limit point at a given time instant deviated from the standard point of the standard mode at the given time instant by the predetermined speed and the predetermined time, an accelerator-to-brake changeover line is defined as a line connecting the accelerator-to-brake changeover judgment points each of which is the changeover judgment point for changeover from the accelerator operation to the brake operation at a given time instant in a standard mode running operation, a brake-to-accelerator changeover line is defined as a line connecting the brake-to-accelerator judgment points each of which is the changeover judgment point for changeover from the brake operation to the accelerator operation at a given time instant in the standard mode running operation, and at least one of the first or second changeover time deviation preset value and the first or second changeover vehicle speed deviation preset value is set at a third preset value within a range demarcated by the upper limit allowance line or the lower limit allowance line.

3. The vehicle testing apparatus as claimed in claim 1, wherein the controller is configured to perform a changeover from the accelerator operation to the brake operation when a vehicle speed sensed at a time instant of a judgment standard point becomes higher than a first changeover line and to perform a changeover from the brake operation to the accelerator operation when the vehicle speed sensed at a time instant of a judgment standard point becomes lower than a second changeover line, the first changeover line being defined as an accelerator to brake changeover line connecting a plurality of accelerator to brake changeover judgment points of a sequence of time instants in a running operation of the standard mode, and the second changeover line being defined as a brake to accelerator changeover line connecting a plurality of brake to accelerator changeover judgment points of a sequence of time instants in a running operation of the standard mode.

4. A vehicle testing method for performing vehicle tests by operating a vehicle on a chassis dynamometer, the vehicle speed testing method comprising:

controlling a speed of the vehicle on the chassis dynamometer by performing changeovers between an accelerator operation to accelerate the vehicle and a brake operation to decelerate the vehicle; and calculating at least one of a first changeover vehicle speed deviation for changeover from the accelerator operation to the brake operation and a second changeover vehicle speed deviation for changeover from the brake operation to the accelerator operation in a vehicle speed following control to drive the vehicle along a standard mode of a vehicle drive pattern defined by time and a vehicle speed within a range of a deviation of a predetermined speed and a deviation of a predetermined time from the standard mode, in a vehicle testing apparatus for performing vehicle tests by operating a vehicle on the chassis dynamometer, wherein the first changeover vehicle speed deviation is calculated by calculating a first inclination of the standard mode by approximate differentiation of the vehicle speed at a judgment standard point of a current time instant on the standard mode of the vehicle drive pattern, multiplying the first inclination of the standard mode by a first changeover time deviation preset value which is a preset value of a time deviation for changeover from the accelerator operation to the brake operation, and calculating the first changeover vehicle speed deviation from the judgment standard point to an accelerator-to-brake changeover judgment point for changeover from the accelerator operation to the brake operation at the current time instant by addition of a product determined by multiplication of the first inclination and the first changeover time deviation preset value and a first changeover vehicle speed deviation preset value which is a preset value of the vehicle speed deviation for the changeover from the accelerator operation to the brake operation, and the second changeover vehicle speed deviation is calculated by calculating a second inclination of the standard mode by approximate differentiation of the vehicle speed at a judgment standard point of the current time instant on the standard mode of the vehicle drive pattern, multiplying the second inclination of the standard mode by a second changeover time deviation preset value which is a preset value of the time deviation for changeover from the brake operation to the accelerator operation, and calculating the second changeover vehicle speed deviation from the judgment standard point to a brake-to-accelerator changeover judgment point for changeover from the brake operation to the accelerator operation at the current time instant by addition of a product determined by multiplication of the second inclination and the second changeover time deviation preset value and a second changeover vehicle speed deviation preset value which is a preset value of the vehicle speed deviation for the changeover from the brake operation to the accelerator operation.

5. A vehicle testing apparatus comprising:

a chassis dynamometer on which a test vehicle is to be operated; and a controller configured to:

perform a vehicle speed following control to drive the test vehicle along a standard mode defining a target vehicle speed varying with time according to a predetermined drive pattern within a range of a predetermined allowable speed deviation and a predetermined allowable time deviation from the target vehicle speed of the standard mode, and thereby to perform a vehicle test of the test vehicle on the chassis dynamometer, cause a changeover between an accelerator operation to accelerate the test vehicle and a brake operation to decelerate the test vehicle, to drive the test vehicle along the target vehicle speed of the standard mode in the vehicle speed following control, by comparing an actual vehicle speed deviation from the target vehicle speed with a changeover vehicle speed deviation, and calculate the changeover vehicle speed deviation by calculating an inclination of the target vehicle speed of the standard mode, multiplying the inclination by a preset time parameter, adding a preset vehicle speed parameter to a product resulting from multiplication between the inclination and the preset time parameter and setting the changeover vehicle speed deviation equal to a sum resulting from addition of the preset vehicle speed parameter and the product, wherein the inclination is a rate of change of the target vehicle speed of the standard mode with respect to time at a current operating point determined by a current time instant and a value of the target vehicle speed at the current time point, the preset time parameter is a parameter representing a preset value of a changeover time deviation which is smaller than the predetermined allowable time deviation, and the preset vehicle speed parameter is a parameter representing a preset value of a changeover vehicle speed deviation which is smaller than the predetermined allowable speed deviation.

6. The vehicle testing apparatus as claimed in claim 5, further comprising a sensor configured to sense an actual vehicle speed of the test vehicle operated on the chassis dynamometer, wherein the controller is configured to cause the changeover between the accelerator operation and the brake operation of the test vehicle, in accordance with a result of a comparison of the actual vehicle speed deviation between the actual vehicle speed sensed by the sensor and the target vehicle speed, with the changeover vehicle speed deviation.

7. The vehicle testing apparatus as claimed in claim 5, wherein the controller is configured to enable adjustment to adjust at least one of the time parameter and the vehicle speed parameter, to adjust frequency of the changeover between the accelerator operation and the brake operation in the vehicle speed following control.

8. The vehicle testing apparatus as claimed in claim 5, wherein the controller is configured to calculate the changeover vehicle speed deviation comprising a first changeover vehicle speed deviation for accelerator-to-brake changeover from the acceleration operation to the brake operation and a second changeover vehicle speed deviation for brake-to-accelerator changeover from the brake operation to the accelerator operation, by using the preset time parameter comprising a first time parameter for the accelerator-to-brake changeover and a second time parameter for the brake-to-accelerator changeover and the preset vehicle speed parameter comprising a first vehicle speed parameter for the accelerator-to-brake changeover and a second vehicle speed parameter for the brake-to-accelerator changeover.

\* \* \* \* \*